E. A. WALZ, Jr.
GUIDE SIGNAL FOR AUTOMOBILES.
APPLICATION FILED JULY 28, 1914.
1,154,461.
Patented Sept. 21, 1915.
3 SHEETS—SHEET 1.
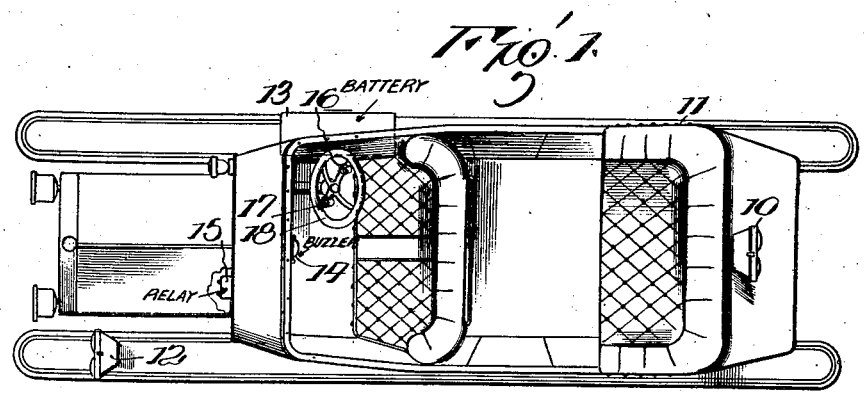
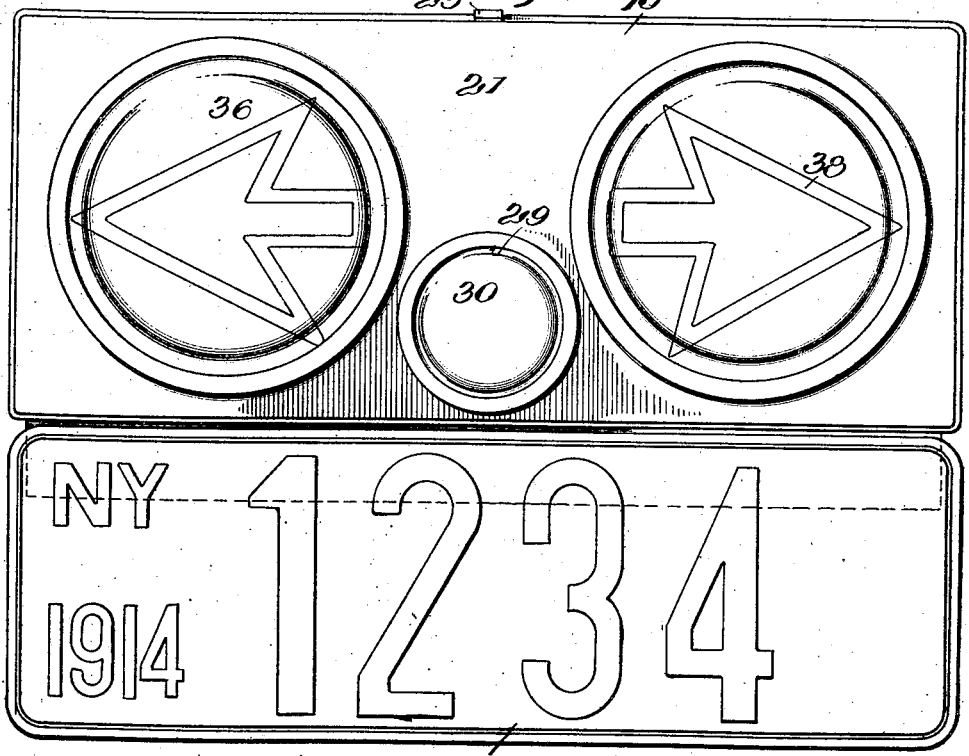

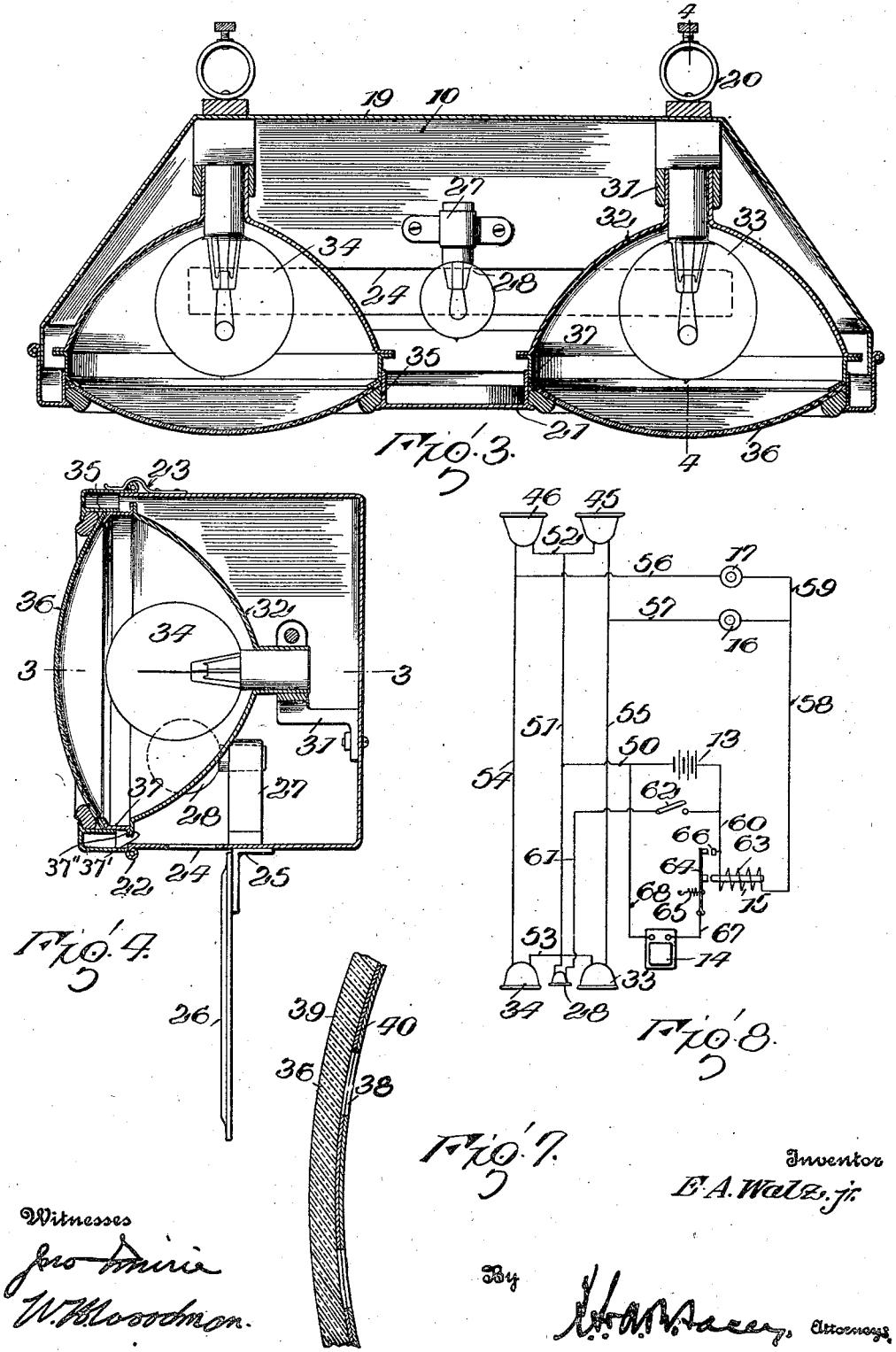

E. A. WALZ, Jr.
GUIDE SIGNAL FOR AUTOMOBILES.
APPLICATION FILED JULY 28, 1914.

1,154,461.

Patented Sept. 21, 1915.
3 SHEETS—SHEET 3.

Witnesses

Inventor
E. A. Walz, Jr.
By
Lacey, Attorneys.

UNITED STATES PATENT OFFICE.

EDGAR A. WALZ, JR., OF NEW YORK, N. Y.

GUIDE-SIGNAL FOR AUTOMOBILES.

1,154,461.  Specification of Letters Patent.  Patented Sept. 21, 1915.

Application filed July 28, 1914. Serial No. 853,749.

*To all whom it may concern:*

Be it known that I, EDGAR A. WALZ, Jr., citizen of the United States, residing at New York, in the county of New York and State of New York, have invented certain new and useful Improvements in Guide-Signals for Automobiles, of which the following is a specification.

My invention relates to new and useful improvements in direction signaling systems for vehicles and more particularly for self-propelled vehicles, the primary object of my invention being the provision of an extremely simple and efficient form of direction signaling system of the visual type, in which the signals are given by the selective lighting of one or more of a plurality of lights.

A still further object of my invention consists in so constructing the rear signal housing and the lights in it that it may be utilized as a tail light and license tag light.

Another advantage of considerable importance which I aim to achieve is the provision of transparent glasses or bull's eyes for the signal lights of such a nature that there can never be any question as to whether the lights are lighted or not, due to reflections from the side lights of a street and further so constructed that the light shining through them will be sufficiently bright to be clearly seen at a distance of over a hundred feet, even in broad day light, this arrangement permitting the use of the signaling system by day as well as by night.

With these and other objects in view, my invention will be more fully described, illustrated in the accompanying drawings, and then more specifically pointed out in the claims which are attached to and form a part of this application.

Figure 5:
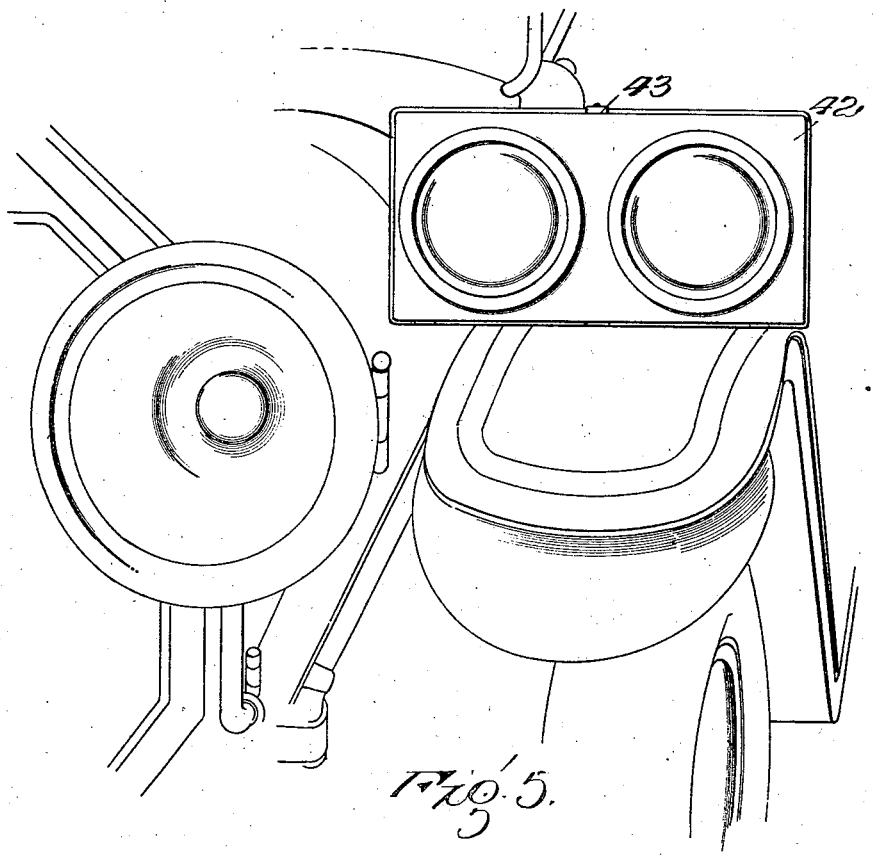
Figure 6:
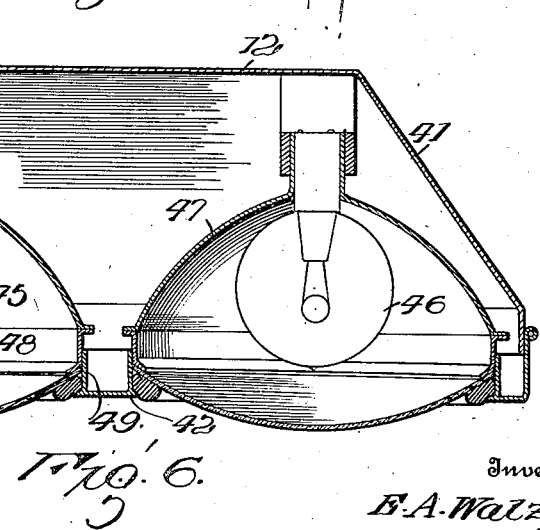

In the drawings: Figure 1 is a top plan view of a motor vehicle, showing my improved signaling system installed thereon, this view being largely diagrammatic, its sole purpose being to disclose the preferred arrangement of parts; Fig. 2 is a rear elevation of the rear signal housing; Fig. 3 is a horizontal sectional view taken on the line 3—3 of Fig. 4, illustrating certain details in the housing construction; Fig. 4 is a vertical sectional view taken on the line 4—4 of Fig. 3, illustrating further details of construction; Fig. 5 is a fragmentary perspective view of the forward signal housing in place; Fig. 6 is a horizontal sectional view, corresponding to that shown in Fig. 3, of the forward signal housing; Fig. 7 is a fragmentary sectional view taken through one of the glasses or bull's eyes, showing the manner of treating it to adapt it for use with my signaling system; Fig. 8 is a diagrammatic view of the wiring of the system.

Corresponding and like parts are referred to in the following description and indicated in all the views of the drawings by the same reference characters.

The preferred embodiment of my invention includes a combined rear signal device, tail light and license tag support, indicated as a whole by the numeral 10 and adapted to be attached at any suitable point to the rear of a vehicle 11, a forward signal device 12 adapted to be mounted at any suitable point near the front of the machine, preferably near the forward end of one of the front mud guards, a storage battery 13 or other suitable source of electrical energy for energizing the lights of the signals, a buzzer 14 and its controlling relay 15 included in the circuits of the signals, and the control buttons 16 and 17, preferably mounted upon the steering wheel 18 of the vehicle and controlling the signal circuits.

My improved combination rear signal device, tail light and license tag support, as best shown in Figs. 2 to 4 of the drawings, includes a casing 19, preferably substantially rectangular in shape and generally formed of sheet metal suitably enameled or coated to present a neat and ornamental appearance and to protect it from rust or corrosion. This casing carries at its back one or more fastening devices 20 of any suitable character for securing the rear signal device to brackets carried by the rear of the vehicle and is closed at its front by a cover 21 hingedly secured along its lower edge to the bottom wall of the casing, as shown at 22 and normally held in closed position by a spring catch 23.

Extending longitudinally of the bottom wall of the casing 19 and spaced from its front edge is a slot 24 and mounted immediately at the rear of this slot is a bracket 25 of any suitable character to support the license tag 26. Mounted substantially centrally of the casing is a bracket 27 arranged to receive an electric light bulb 28 which, as will be later explained, constitutes a tail light for the vehicle and which, as shown in Figs. 3 and 4, is disposed directly above the slot 24 in order that its light may be cast downwardly across the forward face of the license tag. The front wall or cover 21 of the housing is provided, in horizontal alinement with this light bulb 28, with an opening 29 to receive the glass plate or bull's eye 30 through which the light 28 will be displayed. This bull's eye is preferably concavo-convex in order that the light may pass uniformly through all portions of it and is, of course, formed of ruby glass.

At either side of the bracket 27 are located brackets 31 each of which supports a parabolic reflector 32 fitted to receive electric light bulbs 33 and 34, the former being located at the right of the housing and the latter at the left. The front wall or cover 21 of the casing is provided in horizontal alinement with these bulbs with circular openings and about these openings and slightly spaced therefrom with inwardly directed peripheral flanges 35 to receive and support the edge portions of the glasses or bull's eyes 36 which are mounted in the openings in the usual or any preferred manner. At this point it should be noted that the forward edges of the parabolic reflectors 32 carry forwardly extending rings 37 adapted, when the cover is closed, to project at their forward edges within the flanges 35, engaging such flanges snugly in such a manner that each reflector and bull's eye, in effect, forms a substantially light proof housing for the light bulb which they inclose. The reflectors have peripheral outwardly directed flanges and the shutter rings have similar flanges, indicated by the numerals 37' and 37'' respectively, by means of which the rings are secured to the reflectors. Because of this arrangement, the lighting of any one of the three lights above described will not, by any chance, cause transmission of light through any bull's eye other than its own.

As shown in the drawings, the bull's eyes 36 are concavo-convex for the same reason as that given for so forming the bull's eye 30, and as shown in Fig. 2, oppositely pointing arrows or other direction indicating symbols 38 are formed upon them. These bull's eyes are of ruby glass and for use in my signaling system are treated in the manner best illustrated in Fig. 4 in which the bull's eye proper or glass portion is indicated by the numeral 36. The arrow or other symbol is first outlined upon the inner face of the glass and all of the inner remaining surface of the glass is then painted with a coat of red paint 39 which, when dry, is covered with a coat of white paint 40. It will therefore be seen that portions of the bull's eyes are left uncovered with paint to permit free passage of light, while other portions are given a substantially opaque coating to prevent passage of light, for which reason the uncoated parts, when the lights are lighted, will stand out clearly to view. The inner coat of white paint reflects light cast upon it back against the parabolic reflectors of the lights from which it is again reflected, thus increasing the brilliancy or power of the light passing through the uncoated portions of the bull's eyes. At the same time, the intermediate or red coat of paint causes the entire exterior of the bull's eye to appear the same color and shade when the lights are unlighted. Again, these coats of paint, to a great extent, prevent any possibility of confusion as to whether certain lights are lighted or not which might otherwise be caused from street lights or from lights of passing vehicles. By the employment of lights of relatively high candle power for the signaling system, it is possible with the above construction to transmit sufficient light through the outlined symbols of the bull's eyes to give clear signals even in broad day light and at a distance of over a hundred feet.

Referring more specifically to Figs. 5 and 6 of the drawings, it will be seen that the forward signal housing 12 is substantially identical in construction with the rear signal housing with the exception that the opening 29, bull's eye 30 and light 28 are omitted, as also is the slot in the bottom of the casing. The casing proper 41 is provided with a hinged front wall or cover 42 held in closed position by a spring catch 43 and carrying the bull's eyes 44 behind which are mounted the electric light bulbs 45 and 46, the former being located at the left and the latter at the right of the housing. These lights are, of course, supported by and inclosed in parabolic reflectors 47 having shutter rings 48 engaging the inwardly directed flanges 49 about the bull's eye openings, when the cover is closed, to prevent diffusion of light from either light bulb to the other bull's eye. The bull's eyes are, of course, formed in the same manner as the bull's eyes 36, previously described and provided with corresponding signal symbols.

In explaining the wiring of my improved signal system, reference being had to Fig. 8 of the drawings, the separate lamps there shown will be understood as emblematic of the various light bulbs, previously described, and for that reason will bear the corresponding reference characters. A feed wire 50 leads from the positive pole of the storage battery 13 to a common feed wire 51 which runs longitudinally of the vehicle terminating at its front end in leads 52 to the lights 45 and 46 and at its rear end in leads 53 to the signal lights 33 and 34 and to the tail light 28. A wire 54 connects the lights 34 and 46, constituting a portion of a common return circuit for such lights, while a wire 55 similarly connects the lights 33 and 45. Return wires 56 and 57 lead from the wires 54 and 55 to the push buttons 17 and 16, respectively, and a wire 58 leads from the push button 16 to one terminal of the relay 15, a wire 59 leading from the push button 17 to the wire 58. A wire 60 leads from the other terminal of the relay to the negative pole of the storage battery 13. A wire 61 leads from this wire 60 to the tail light 28 and includes a manually operable switch 62 by means of which the lighting of the tail light may be controlled, this switch being located upon the dash or at any other convenient part of the vehicle. As shown in Fig. 8, the relay includes an electro-magnet 63 having an armature 64 normally held from the pole of the magnet by an adjustable spring 65 and movable upon sufficient energization of the magnet to engage a contact 66 included in the circuit through the relay. This armature forms a portion of the buzzer circuit, a wire 67 leading from the armature to the buzzer 14 and a wire 68 leading from the buzzer to the feed wire 50.

Although I have described the above wiring system in all its details, it will of course be understood that the greater portion of such details are immaterial and that departures from this wiring system may be made providing the same results may be obtained without in any way departing from the spirit of my invention.

The foregoing description, particularly when taken in connection with the drawings, is believed to constitute such a clear disclosure of my invention as will render any detailed description of its operation unnecessary. Should the driver of the vehicle wish to turn to the right, he will close the circuit through the push button 16, under which conditions, current will flow from the battery through the wire 50, wire 51 and certain of the leads of this wire to the lights 33 and 45, from these lights to the return wires 55, 57 and 58 through the relay 15 and back to the battery. On the other hand, if the driver wishes to turn to the left, he will close the circuit through the push button 17 when the circuit from the battery through the wires 50 and 51 and certain leads of the wire 51 to the lights 34 and 46, through the return wires 54, 56 and 58 and through the relay and wire 60 back to the battery will be formed. If, on the other hand, the driver wishes to stop or reverse the car, he will close both the described circuits by simultaneously operating both push buttons. It should be noted that current will, at all times, pass to the tail light 28, unless its separate controlling switch 62 is open.

As above set forth, the circuits for both the lights at the right and the lights at the left pass through the relay 15. This relay is so adjusted that the passage of sufficient current to energize the two lights in either circuit will cause sufficient current to pass through the relay to make it attract its armature and so sound the buzzer. On the other hand, if less current passes through either circuit, the relay will not be closed and the buzzer will remain silent. The driver can, therefore, always tell whether, upon closing of either circuit, both lights are lighted or not and is therefore always certain that his signal is being given. I reserve, however, the right to make various changes, within the scope of the appended claims without departing from the spirit of my invention. For instance, although I have described the bull's eyes as made of ruby glass and in concavo-convex form, I may wish to use colored glass of different colors and shades and either straight or bent, treated with coats of paint as described. Furthermore, some other signaling device may be substituted for the buzzer. Again, either the front or rear signaling device may be employed independently of the other or the front signaling device or a duplicate of it may be employed at the rear in connection with the usual rear light and license number.

Having thus described the invention, what is claimed as new is:

1. In a direction indicator for vehicles, a casing, spaced transparent bull's eye set in openings in the front wall of the casing, inwardly directed flanges surrounding the bull's eyes, reflectors mounted in the casing, one at the rear of each bull's eye and projecting closely within the adjacent flange to form with the bull's eye a substantially light proof chamber, and an electric light bulb mounted within each reflector, each bull's eye being formed of colored glass with a portion of its inner face coated with an inner layer of paint of the color of the glass and an outer layer of white paint.

2. A direction indicator for vehicles including a casing open at its front, a hinged closure for the casing provided with spaced circular openings, inwardly directed flanges surrounding the openings, bull's eyes mounted in the openings with the flanges projecting inwardly beyond them, reflectors mounted in the casing and having peripheral outwardly directed flanges adapted, when the closure is shut, to be spaced from the inwardly directed flanges thereof, lights mounted in the reflectors, and shutter rings having body portions adapted to seat within the inwardly directed flanges of the closure when the latter is shut and having outwardly directed peripheral flanges secured to the outwardly directed flanges of the reflectors, the shutter rings being free of connection except with the reflectors, whereby the closure may be opened and shut without affecting the reflectors or lights therein.

3. In a direction indicator for vehicles, a casing, a transparent bull's eye set in an opening in one wall of the casing, and a light in the casing to project its rays through the bull's eye, the bull's eye being formed of colored glass with a portion of its inner face coated with overlying layers of paint of different colors, the outer layer being a reflector of light.

4. In a direction indicator for vehicles, a casing, a transparent bull's eye set in an opening in one wall of the casing, and a light in the casing to project its rays through the bull's eye, the bull's eye being formed of colored glass with a portion of its inner face coated with overlying layers of paint of different colors, the outer layer of such paint being white.

5. In a direction indicator for vehicles, a casing, a transparent bull's eye set in an opening in one wall of the casing, and a light in the casing to project its rays through the bull's eye, the bull's eye being formed of colored glass with a portion of its inner face coated with overlying layers of paint of different colors, the outer layer of such paint being white and the inner layer of such paint being the color of the glass employed.

In testimony whereof I affix my signature in presence of two witnesses.

EDGAR A. WALZ, JR. [L. S.]

Witnesses:
　T. C. WALZ,
　JOHN A. SAMBORN.